United States Patent
Go

(10) Patent No.: US 8,116,830 B2
(45) Date of Patent: Feb. 14, 2012

(54) DATA INPUT KEY FOR A PORTABLE APPARATUS AND KEY ARRAY THEREOF

(75) Inventor: Sung-Soo Go, Seoul (KR)

(73) Assignee: Samsung Electronics Co., Ltd (KR)

( * ) Notice: Subject to any disclaimer, the term of this patent is extended or adjusted under 35 U.S.C. 154(b) by 1988 days.

(21) Appl. No.: 11/131,869

(22) Filed: May 18, 2005

(65) Prior Publication Data

US 2006/0052145 A1 Mar. 9, 2006

(30) Foreign Application Priority Data

Sep. 9, 2004 (KR) ........................ 10-2004-0072099

(51) Int. Cl.
*H04M 1/00* (2006.01)

(52) U.S. Cl. .................... 455/575.1; 455/566; 455/550.1

(58) Field of Classification Search ............... 455/575.1, 455/566, 90.3, 575.3, 550.1, 575.4; 379/433.07, 379/433.06; 341/22, 23; 400/485, 486, 472, 400/490; 708/145; 345/169, 168, 173, 175
See application file for complete search history.

(56) References Cited

U.S. PATENT DOCUMENTS

| | | | |
|---|---|---|---|
| 5,612,690 A | | 3/1997 | Levy |
| 5,861,823 A | * | 1/1999 | Strauch et al. .................. 341/22 |
| D472,551 S | * | 4/2003 | Griffin .......................... D14/346 |
| 6,567,652 B1 | * | 5/2003 | Wu .............................. 455/575.1 |
| 6,634,816 B2 | * | 10/2003 | Thomas .......................... 400/472 |
| 2002/0064018 A1 | * | 5/2002 | Suzuki ............................ 361/288 |
| 2003/0012368 A1 | * | 1/2003 | Smallwood .............. 379/433.07 |
| 2004/0212598 A1 | * | 10/2004 | Kraus et al. .................... 345/168 |
| 2005/0019079 A1 | * | 1/2005 | Griffin et al. ................... 400/486 |
| 2005/0190160 A1 | * | 9/2005 | Wang et al. .................... 345/168 |
| 2006/0062626 A1 | * | 3/2006 | Hamilton et al. ............. 400/490 |

FOREIGN PATENT DOCUMENTS

| | | | |
|---|---|---|---|
| JP | 2003258977 A | * | 9/2003 |
| WO | WO 00/65419 | | 11/2000 |
| WO | WO 01/71746 | | 9/2001 |

* cited by examiner

*Primary Examiner* — Melur Ramakrishnaiah

(74) *Attorney, Agent, or Firm* — The Farrell Law Firm, P.C.

(57) ABSTRACT

A data input key for a portable apparatus and a key array thereof. The data input key includes a first key having a first recess positioned on the top thereof and a second key that has a second recess positioned on the top thereof, while facing the first recess, and which is disposed adjacent to the first key while facing it. In a first mode, the same data is recognized when either of the keys are pressed, and in a second mode different data is recognized when each of the first and second keys are pressed.

10 Claims, 5 Drawing Sheets

DATA INPUT KEY FOR A PORTABLE APPARATUS AND KEY ARRAY THEREOF

PRIORITY

This application claims priority to an application entitled "Data Input Key for Portable Apparatus and Key Array Thereof" filed with the Korean Intellectual Property Office on Sep. 9, 2004 and assigned Ser. No. 2004-72099, the contents of which are hereby incorporated by reference.

BACKGROUND OF THE INVENTION

1. Field of the Invention

The present invention relates generally to portable apparatuses such as cellular phones, PDAs (personal digital assistants), HHPs (hand held phones), game phones, camera phones, Internet phones, etc., and more particularly to keys used for inputting data through a finger pressing operation and a key array utilizing the same.

2. Description of the Related Art

The trend for portable apparatuses has tended toward compactness, slimness, and lightness in consideration of portability, and also toward multimedia availability in order to provide a wider variety of functions. In particular, future portable apparatuses are expected to incorporate greater multi-functionality and multi-purpose utilization, as well as greater compactness and lightness, but also will be modified to be suitable for various multimedia environments or Internet environments. Additionally, such portable apparatuses are now commonly used by people of all ages and all walks of life throughout the world and are recognized by some people as a nearly indispensable commodity, which must be carried all the time.

Conventional portable communication apparatuses are generally classified into various categories according to their appearance, such as bar-type portable communication apparatuses, flip-type portable communication apparatuses, and folder-type portable communication apparatuses. In addition, portable communication apparatuses may be classified into neck wearable type communication apparatuses and wrist wearable type communication apparatuses according to the position at or the way in which a user carries the communication apparatuses. Furthermore, portable communication apparatuses may be classified into rotation-type communication apparatuses and sliding-type communication apparatuses according to ways of opening and closing the portable communication apparatuses. These variously classified portable communication apparatuses can be easily understood by those skilled in the art.

Additionally, conventional portable communication apparatuses now tend to have a function of transmitting data at a high speed, in addition to the basic function of performing voice communication. That is, according to the increase of demand by consumers, portable communication apparatuses now tend to provide a service using a wireless communication technology capable of transmitting data at a high speed. Based on these current trends, conventional portable communication apparatuses are commonly equipped with a camera lens to transmit video signals. Portable communication apparatuses generally have an external or embedded camera lens module to perform video communication with a desired partner or to take pictures of a desired object.

However, typical data input devices for portable apparatuses are keys which a user can press to input desired information. Only the top portion of the keys is exposed to the exterior of portable apparatuses and is visible to the user, thereby enabling the user touch and press the key top to input desired information.

However, conventional keys used for portable apparatuses have a problem in that, although the user can recognize a key's function from the marking on the key top and press it with his finger to input desired data, the accuracy of key pressing operation may deteriorate in a very urgent situation mistakenly. As such, the user often experiences inconvenience in key pressing operation because the key tops are made in a small size to make the body compact. In this case, a user having larger fingers may have difficulty in performing desired key pressing operations.

Considering the above-described problems, one solution is to make the key tops larger. However, this adversely affects the compactness of the body.

SUMMARY OF THE INVENTION

Accordingly, the present invention has been designed to solve the above and other problems occurring in the prior art. An object of the present invention is to provide data input keys, which can be conveniently used to input data, and a key array thereof.

Another object of the present invention is to provide data input keys having improved accuracy and quickness in key pressing and a key array thereof.

Still another object of the present invention is to provide data input keys enabling same predetermined data to be recognized from two different keys in a dialing mode for convenient use and a key array thereof.

In order to accomplish the above and other objects, there is provided a data input key for a portable apparatus including a first key having a first recess positioned on the top thereof, a second key having a second recess positioned on the top thereof, while facing the first recess and which is disposed adjacently to the first key while facing it. Each corresponding data is recognized when the first or second key is pressed alone in a mode and the same predetermined data is recognized when any one of the first and second keys is pressed in another mode.

In accordance with another aspect of the present invention, there is provided a data input key array for a portable apparatus having a data input key including a first key having a first recess positioned on the top thereof, a second key which has a second recess positioned on the top thereof, while facing the first recess, and which is disposed adjacently to the first key while facing it. A number of data input keys are positioned on a body in predetermined positions along the horizontal direction, along the vertical direction, or along both horizontal and vertical directions while being adjacent and aligned to one another with the top portion of the first and second keys being exposed.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may make the subject matter of the present invention unclear.

Figure 1:
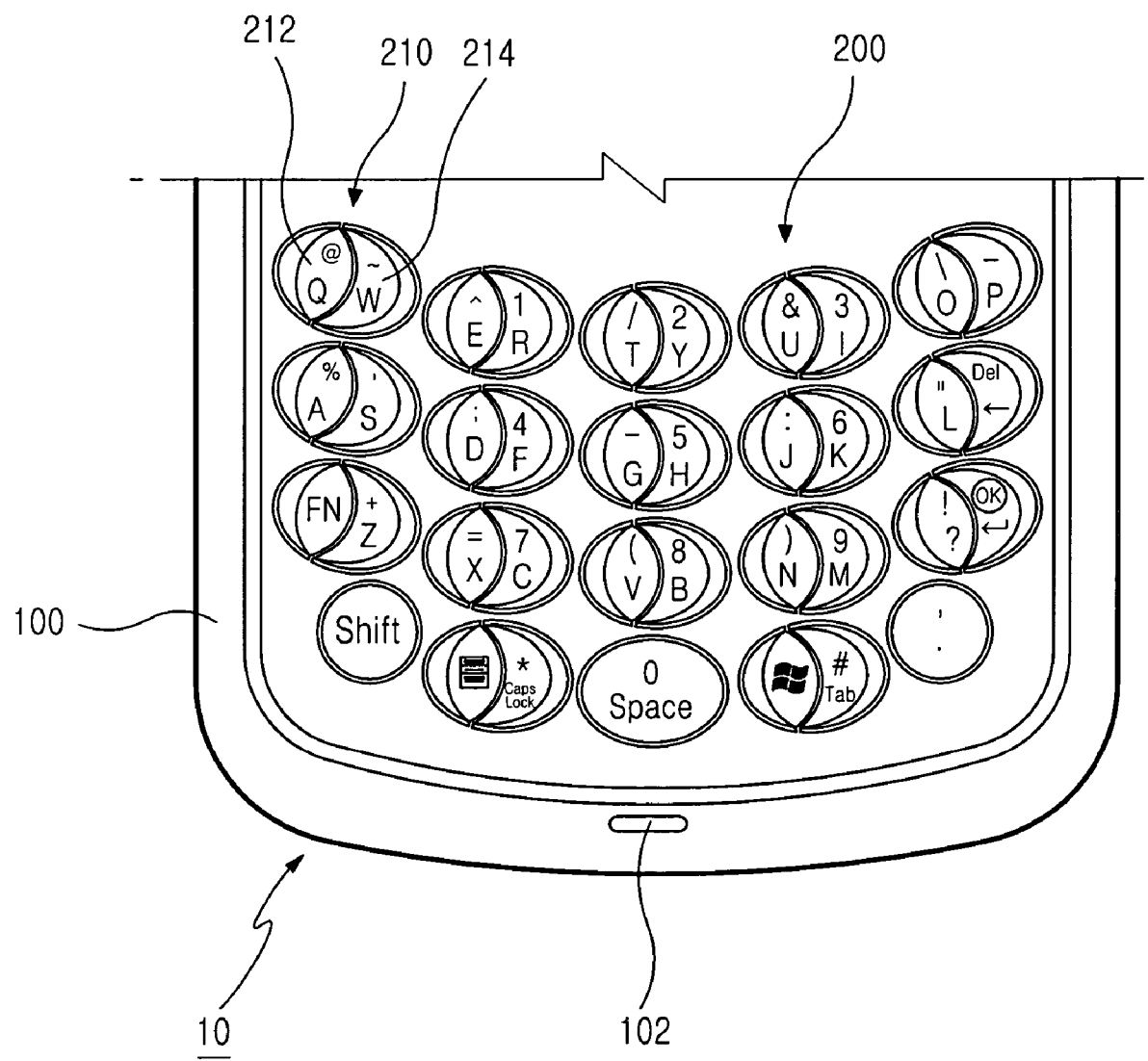
FIG. 1 is a front view illustrating a portable terminal equipped with a key array including data input keys according to a preferred embodiment of the present invention.
Figure 2:
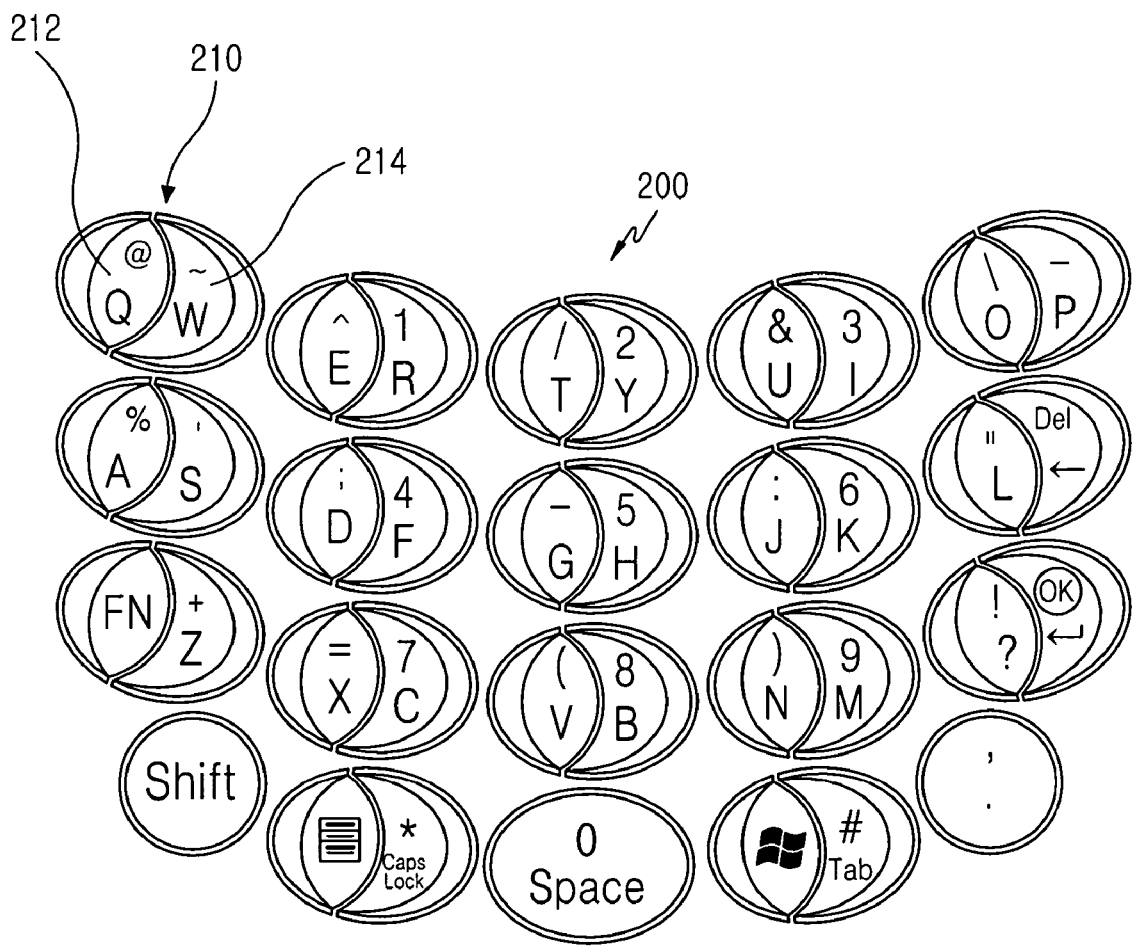
FIG. 2 is a top view illustrating a key array including data input keys according to a preferred embodiment of the present invention.

As illustrated in FIGS. 1 and 2, a data input key 210 for a portable apparatus 10 according to the present invention includes a first key 212 and a second key 214 positioned adjacent to the first key 212. The first and second keys 212 and 214 constitute a pair and are positioned on the body 100 of the portable apparatus in a predetermined position. More specifically, they are positioned on the upper, lower, or lateral surface of the body with the top portion thereof exposed. In FIG. 1, the data input key 210 is positioned on the upper surface of the body 100. Preferably, the data input key 210 causes each corresponding data to be recognized when the first or second keys 212 or 214 is pressed alone in a mode and to cause the same data to be recognized when any one of the first and second keys 212 and 214 is pressed in another mode.

For example, "1" is recognized when any one of "E" and "R" keys is pressed in a dialing mode. In a text message transmission mode, "E" is recognized when "E" key is pressed and "R" is recognized when "R" key is pressed.

Additionally, reference numeral 102 indicates a microphone device.

Figure 3:
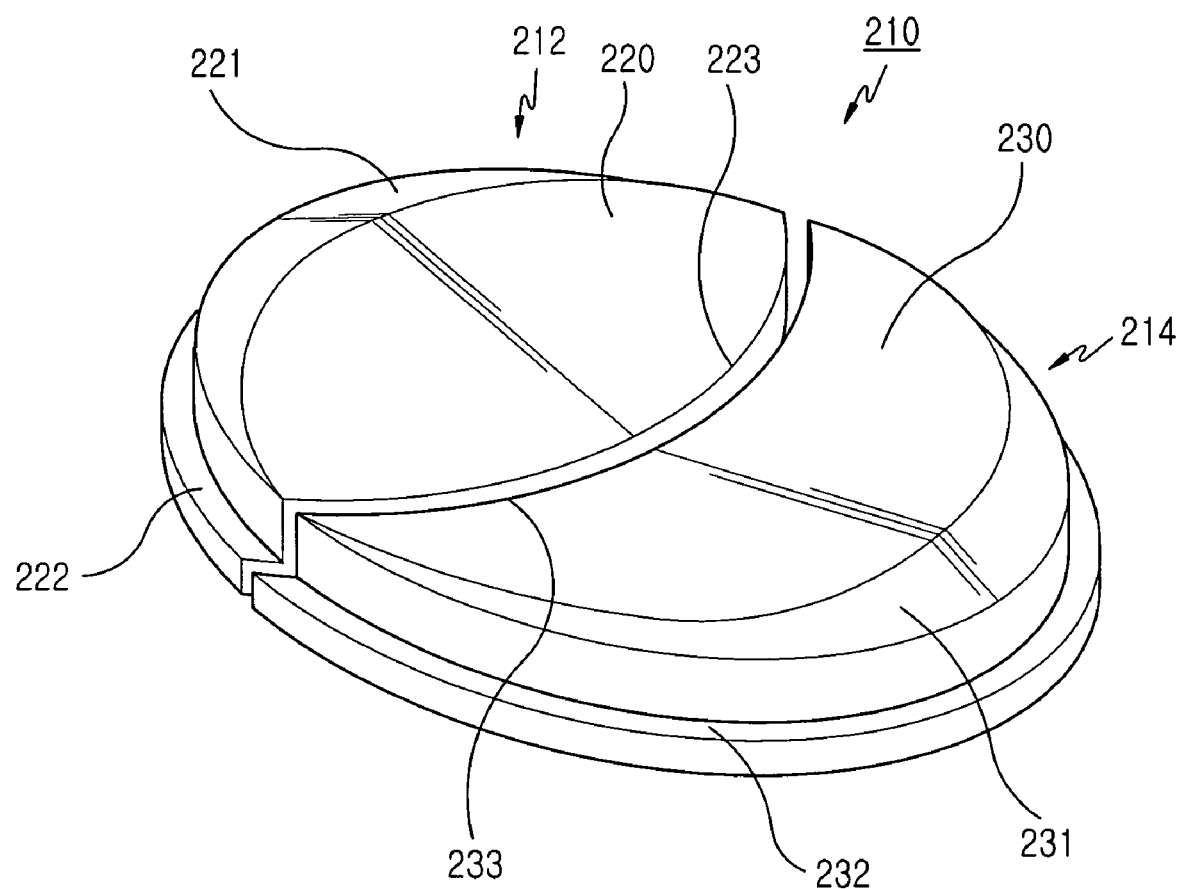
FIG. 3 is a perspective view illustrating a data input key according to a preferred embodiment of the present invention.
Figure 4A:
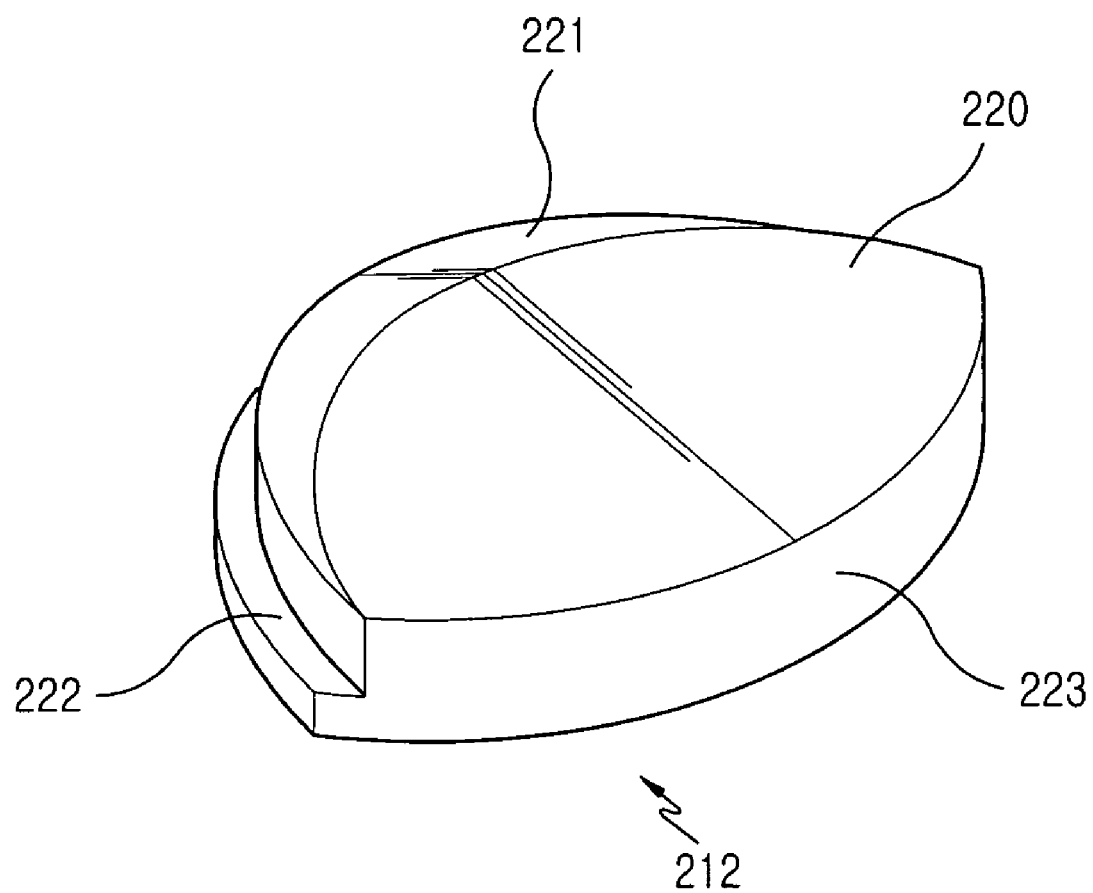
FIG. 4A is a perspective view illustrating a first key of a data input key according to a preferred embodiment of the present invention.
Figure 4B:
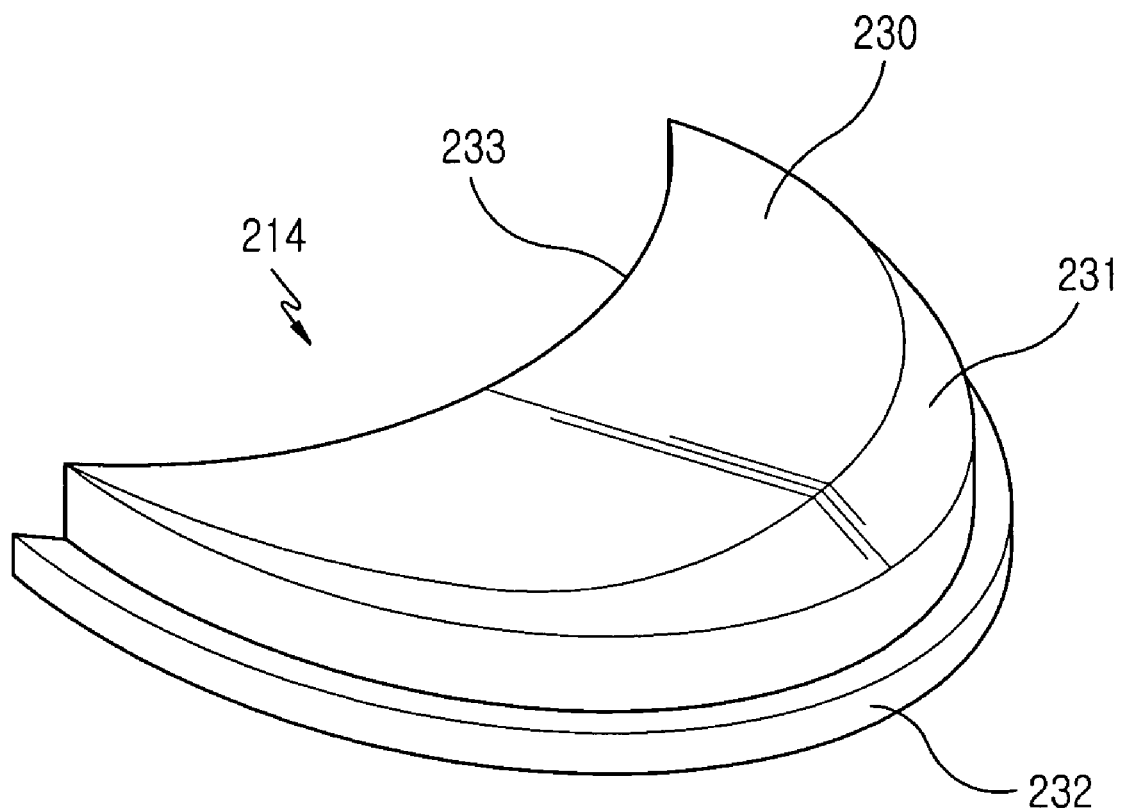
FIG. 4B is a perspective view illustrating a second key of a data input key according to a preferred embodiment of the present invention.

As illustrated in FIGS. 3 to 4B, the data input key 210 (i.e., the first and second keys 212 and 214) has an upper portion, including the top, exposed from the body 100 (as illustrated in FIG. 1) to be touched and pressed and a lower portion, including the bottom that is contained and hidden in the body.

The first key 212 has a first recess 220 positioned on the top thereof and a first slant curved surface 221 positioned adjacently to the first recess 220. The bottom of the first recess 220 may be a planar or curved surface. The second key 214 has a second recess 230 which faces the first recess 220 and a second slant curved surface 231 positioned adjacent to the second recess 230.

Preferably, the first and second recesses 220 and 230 are respectively slanted in such a direction that they face each other and provide a single groove, which has a shape corresponding to that of the end portion of a user's finger for convenience (i.e., quickness and accuracy) in key pressing operation.

As illustrated in FIG. 4A, the first key 212 has a first engagement portion 222 formed on the bottom thereof while protruding in the outer peripheral direction to be constrained by the body. As illustrated in FIG. 4B, the second key 214 has a second engagement portion 232 formed on the bottom thereof while protruding in the outer peripheral direction to be constrained by the body.

Preferably, the first key 212 has a first boundary surface 223 which is convex toward the second key 214 and the second key 214 has a second boundary surface 233 which has a concave shape corresponding to the first boundary surface 223. As such, the first and second boundary surfaces 223 and 233 of the first and second keys 212 and 214 have a curved shape, particularly convex and concave shapes, and expand the boundary surface. This design improves the accuracy of key pressing operation when one or both of the first and second keys 212 and 214 are pressed, because the second boundary surface 233 surrounds the first boundary surface 223.

When the first and second keys 212 and 214, which are configured as illustrated above, are seen from the front direction, the top portion of the keys looks like an ellipse and may also look like a single key. The first key 212 is conveniently pressed because the first recess 220 and the first slant curved surface 221 provide a protruding top ridgeline. The second key 214 is conveniently pressed because the second recess 230 and the second slant curved surface 231 provide another protruding top ridgeline. The first and second recesses 220 and 230 provide a groove, which is convenient to press with a finger. Consequently, the present invention provides improved quickness and accuracy in key pressing operation in a dialing mode for user convenience.

A number of data input keys 210, including first and second keys 212 and 214, are positioned on the body 100 in predetermined positions while being adjacent to one another and constitute a key array. Preferably, the data input keys 210 are preferably used as numeral, character, or function keys in a dialing mode. A number of data input keys 210 may be arranged on the body 100 in predetermined positions in the horizontal direction, in the vertical direction, or in both horizontal and vertical directions while being aligned to one another as illustrated in FIG. 2.

As described above, the present invention provides first and second keys having concave and convex top portions for improved quickness and convenience in data input operation (i.e., key pressing).

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A data input key for a portable apparatus, the data input key comprising:
   a first key having a first curved recess positioned on a top circumference thereof; and
   a second key having a second curved recess positioned on a top circumference thereof, the second key corresponding in curvature to the first curved recess and being disposed adjacent to the first key,
   wherein first data is recognized when at least one of the first and second keys is pressed in a first mode, and in a second mode, second data is recognized when the first key is pressed and third data is recognized when the second key is pressed.

2. The data input key as claimed in claim 1, wherein the first and second curved recesses are respectively slanted to face each other and provide a single groove there between.

3. The data input key for a portable apparatus as claimed in claim 1, wherein the first key has a first slant curved surface positioned adjacently to the first curved recess and a first engagement portion positioned on a bottom thereof to constrain the first key with a body of the portable apparatus.

4. The data input key as claimed in claim 1, wherein the second key has a second slant curved surface positioned adjacent to the second curved recess and a second engagement portion positioned on at a bottom surface thereof, to constrain the second key with a body of the portable apparatus.

5. A data input key for a portable apparatus, the data input key comprising:
  a first key having a first recess positioned on a top circumference thereof; and
  a second key having a second recess positioned on a top circumference thereof, the second key being disposed adjacent to the first key,
  wherein the first key has a first boundary surface, which is convex toward the second key, and the second key has a second boundary surface having a concave shape.

6. The data input key as claimed in claim 1, wherein the top circumferences of the first and second keys define an ellipse when viewed from a front direction.

7. A data input key array for a portable apparatus, the data input key array comprising:
  at least one data input key including a first key having a first curved recess positioned on a top circumference thereof and a second key having a second curved recess positioned on a top circumference thereof,
  wherein the second curved recess of the second key corresponds in curvature to the first curved recess of the first key, and
  wherein the second key is disposed adjacent to the first key.

8. The data input key array as claimed in claim 7, wherein a number of the at least one data input keys are positioned on a body in predetermined positions along at least one of a horizontal direction and a vertical direction, while being adjacent and aligned to each another with the top circumferences of the first and second keys being exposed.

9. The data input key array as claimed in claim 8, wherein the first and second curved recesses are respectively slanted in such a direction that they face each other and provide a single groove.

10. The data input key array as claimed in claim 8, wherein predetermined data is recognized when any one of the first and second keys is pressed in a dialing mode.

\* \* \* \* \*